(12) United States Patent
Friend et al.

(10) Patent No.: US 9,773,175 B2
(45) Date of Patent: Sep. 26, 2017

(54) SYSTEM AND METHOD FOR TRACKING POSITION OF CABLE ATTACHED TO A MACHINE

(71) Applicant: Caterpillar Inc., Peoria, IL (US)

(72) Inventors: Paul R. Friend, Morton, IL (US); Paul E. Rybski, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 159 days.

(21) Appl. No.: 14/795,138

(22) Filed: Jul. 9, 2015

(65) Prior Publication Data

US 2017/0011266 A1 Jan. 12, 2017

(51) Int. Cl.
*G06K 9/00* (2006.01)
*B60L 9/00* (2006.01)
*B60M 7/00* (2006.01)
*H02G 11/00* (2006.01)

(52) U.S. Cl.
CPC .......... *G06K 9/00791* (2013.01); *B60L 9/00* (2013.01); *B60L 2200/40* (2013.01); *B60L 2250/10* (2013.01); *H02G 11/00* (2013.01)

(58) Field of Classification Search
CPC ......... G06K 9/00791; B60L 9/00; B60M 7/00
USPC ..... 701/50, 26; 191/12 C, 12.2 R; 340/425.5
See application file for complete search history.

(56) References Cited

U.S. PATENT DOCUMENTS

| | | | |
|---|---|---|---|
| 3,943,306 A | 3/1976 | Aihara et al. | |
| 4,108,264 A | 8/1978 | Tanaka | |
| 6,119,837 A | 9/2000 | Tschurbanoff et al. | |
| 7,793,442 B2 | 9/2010 | Koch et al. | |
| 7,958,982 B2 | 6/2011 | Everett et al. | |
| 8,332,106 B2 | 12/2012 | Yuet et al. | |
| 8,485,330 B2 | 7/2013 | Pack et al. | |
| 8,978,851 B2 | 3/2015 | Tojima et al. | |
| 2009/0265962 A1* | 10/2009 | Koch | E02F 9/2033 37/413 |
| 2009/0266664 A1* | 10/2009 | Everett | B60Q 1/52 191/12 C |
| 2014/0107882 A1 | 4/2014 | Tojima et al. | |

* cited by examiner

*Primary Examiner* — Marthe Marc-Coleman (57) ABSTRACT

A system for tracking a position of a cable attached between a power source and a machine in a worksite is disclosed. The cable is further coupled to a guiding device located in the worksite between the power source and the machine. The system includes a perception module disposed on the machine to detect a location of the guiding device. The system further includes a controller disposed to be in communication with the perception module. The controller determines the location of the guiding device with respect to a location of the machine and determines a distance between the guiding device and the machine. The controller further compares the distance with a first threshold distance and a second threshold distance and generates a warning if the distance is greater than the first threshold distance or smaller than the second threshold distance.

20 Claims, 5 Drawing Sheets

SYSTEM AND METHOD FOR TRACKING POSITION OF CABLE ATTACHED TO A MACHINE

TECHNICAL FIELD

The present disclosure relates to a system and a method for tracking a position of a cable attached to a machine operating in a worksite.

BACKGROUND

Machines, such as excavators and mining shovels, are typically used for mining or various earth moving operations. The machines are electrically powered by a remotely located power source. In an example, electric rope shovels that are employed in a worksite to perform excavating operations are connected to a power source, such as an electric generator, located remotely from the worksite via electric cables. The electric cables are attached to a rear end of the electric rope shovel. The electric cables are further coupled to a guiding device located between the electric rope shovel and the power source. The guiding device is generally used for guiding the electric cable located behind the electric rope shovel and allows the electric rope shovel to move the electric cables to another location. If the machine moves away from the guiding device, then the electric cables may stretch and the machine may drag the guiding device along a work surface. If the machine moves close to the guiding device, then the machine may run-over a portion of the electric cable extending between the machine and the guiding device. Hence, undesired movement of the machine with respect to the guiding device may damage the portion of the electric cables extending between the machine and the guiding device.

U.S. Pat. No. 7,958,982 discloses a cable guide for a mobile machine. The cable guide includes a supporting body, a guide member, and an electronic signaling instrument. The supporting body is configured to engage a worksite. The guide member is mounted on the supporting body and is configured to direct the cable in a fixed travel path in response to movement by the mobile machine. The electronic signaling instrument is engaged with the guide member and is configured to transmit an electronic signal indicative of a location of the cable guide.

SUMMARY OF THE DISCLOSURE

In one aspect of the present disclosure, a system for tracking a position of a cable attached between a power source and a machine in a worksite is provided. The cable is releasably coupled to a guiding device located in the worksite between the power source and the machine. The system includes a perception module disposed on the machine. The perception module is configured to detect a location of the guiding device within the worksite. The system further includes a controller disposed to be in communication with the perception module. The controller is configured to determine the location of the guiding device with respect to a location of the machine in the worksite. The controller is further configured to determine a distance between the guiding device and the machine and compare the distance with a first threshold distance and a second threshold distance. The controller is further configured to generate a warning if the distance is greater than the first threshold distance or smaller than the second threshold distance.

In another aspect of the present disclosure, a machine is provided. The machine includes an undercarriage having a ground engaging member configured to support the machine and a frame rotatably disposed on the undercarriage. The machine further includes a cable attached to the undercarriage for receiving power from a power source located remotely from the machine. The cable is further releasably coupled to a guiding device disposed at a worksite between the power source and the machine. The machine further includes a system for tracking a position of the cable extending between the machine and the guiding device. The system includes a perception module disposed on the machine. The perception module is configured to detect a location of the guiding device within the worksite. The system further includes a controller disposed to be in communication with the perception module. The controller is configured to determine the location of the guiding device with respect to a location of the machine in the worksite. The controller is further configured to determine a distance between the guiding device and the machine, and compare the distance with a first threshold distance and a second threshold distance. The controller is further configured to generate a warning if the distance is greater than the first threshold distance or smaller than the second threshold distance.

In yet another aspect of the present disclosure, a method of tracking a position of a cable attached between a power source and a machine in a worksite is provided. The cable is releasably coupled to a guiding device located in the worksite between the power source and the machine. The method includes determining a location of the guiding device with respect to a location of the machine in the worksite. The method further includes determining a distance between the guiding device and the machine. The method further includes comparing the distance with a first threshold distance and a second threshold distance. The method further includes generating a warning if the distance is greater than the first threshold distance or smaller than the second threshold distance.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
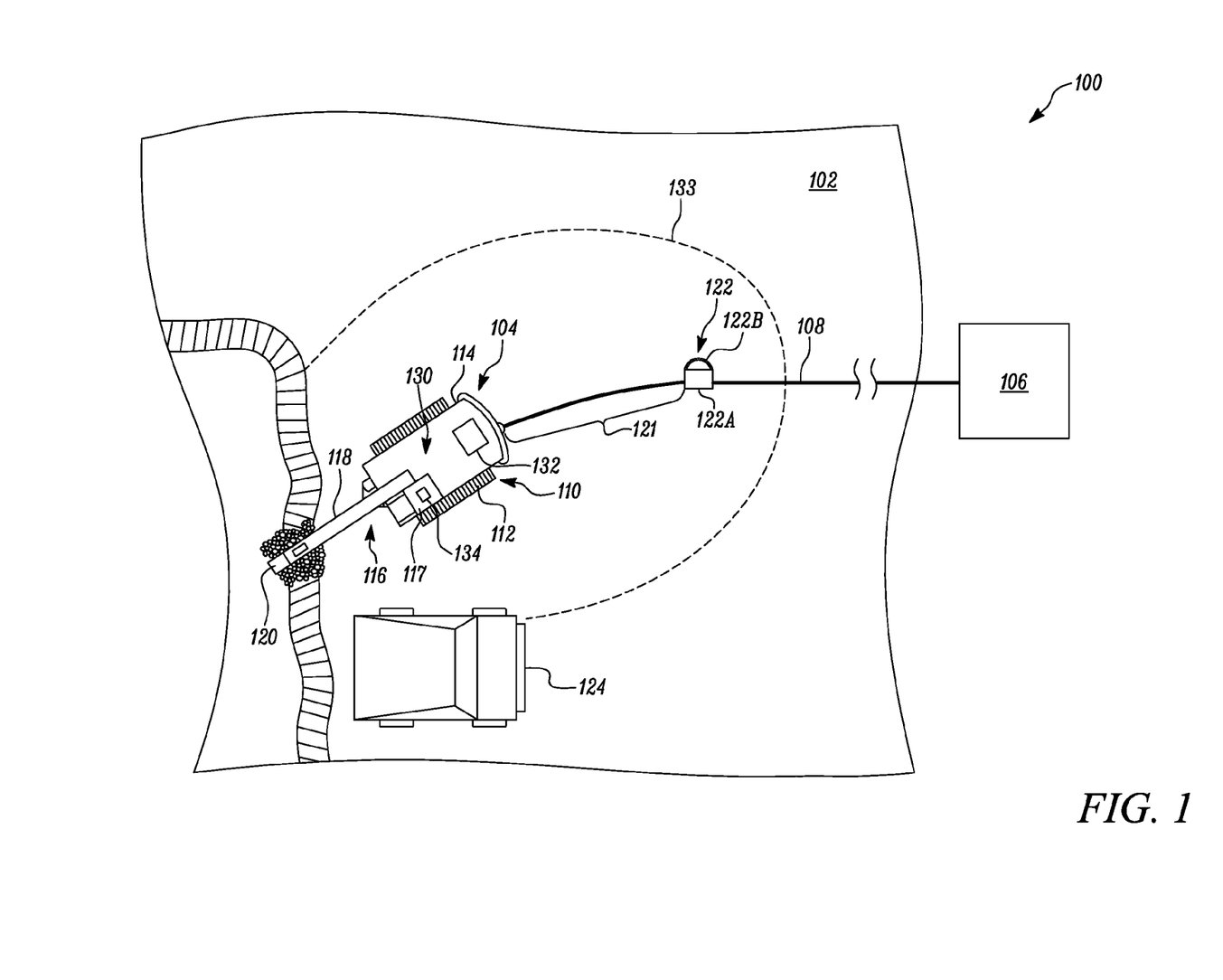
FIG. 1 is a schematic top view of a worksite including a system for tracking a position of a cable attached to a machine operating in the worksite, according to an embodiment of the present disclosure.

FIG. 1 illustrates a schematic top view of a worksite 100 including a work surface 102. The worksite 100 may be a portion of a mining site, a landfill, a quarry, a construction site, a road worksite, a forest, a farm, or any other area in which movement of material is desired. As shown in FIG. 1, a machine 104 is controlled to perform various earth moving operations in the worksite 100. In the illustrated embodiment, the machine 104 is an electric rope shovel. The machine 104 is electrically communicated with a power source 106 located remotely from the worksite 100. In an example, the power source 106 may be a generator set. The power source 106 may include an engine and a generator coupled thereto to generate an electric power required for performing various operations of the machine 104. In another example, the power source 106 may be derived from a power plant located remotely from the worksite 100. A cable 108 is attached between the machine 104 and the power source 106 to communicate the electric power received from the power source 106 to the machine 104. In various aspects, the machine 104 may be an off-highway vehicle, such as a hydraulic shovel, a drilling machine, or any other vehicle that may be electrically communicated with a remotely located power source. The machine 104 may be controlled in an autonomous mode, a semi-autonomous mode, or a manual mode.

The machine 104 includes an undercarriage 110 for moving the machine 104 over the work surface 102. The undercarriage 110 includes a ground engaging member 112 for supporting the machine 104 and for engaging with the work surface 102 to move the machine 104 along the work surface 102. In the illustrated aspect of the present disclosure, the ground engaging member 112 is a pair of tracks. However, in other aspect of the current disclosure, the ground engaging member 112 may be a plurality of wheels. The machine 104 further includes a frame 114 rotatably disposed on the undercarriage 110. The frame 114 may support various components of the machine 104 including an implement 116 and an operator cab 117. The operator cab 117 may include various control systems, such as a hydraulic crowd control system and an electric control system for controlling operations of the machine 104 in response to inputs from an operator.

The implement 116 includes a boom 118 having a bottom end coupled to the frame 114 and a top end supported to the frame 114 by ropes. A dipper 120 is operatively coupled at a front end of a dipper handle (not shown). The dipper 120 may be controlled to dig into the work surface 102 to perform earth moving operation, such as an excavation operation. In an example, the dipper 120 may be a bucket having blades attached thereto. The dipper handle may be slidably supported in the boom 118 to raise and lower the dipper 120. The dipper 120 may be further suspended from the boom 118 by a dipper cable (not shown). A winch (not shown) may be mounted on the frame 114. The dipper cable may be secured to the winch. The winch may include a winch drum for winding and unwinding the dipper cable such that the dipper 120 may raise and lower relative to the boom 118.

The machine 104 may include one or more electric motors (not shown) to facilitate the machine 104 to perform various operations including actuation of the implement 116. The cable 108 may be communicably coupled with the electric motor to receive the electric power from the power source 106. The cable 108 includes one or more current carrying elements, such as copper wires, and an outer casing to enclose the copper wires.

A first end of the cable 108 may be coupled to the power source 106 and a second end of the cable 108 may be attached to the undercarriage 110. The cable 108 is further releasably coupled to a guiding device 122 disposed in the worksite 100. The guiding device 122 is disposed between the power source 106 and the machine 104. Specifically, the guiding device 122 is disposed in the worksite 100 proximate to the location of the machine 104 such that a portion 121 of the cable 108 extending between the guiding device 122 and the machine 104 may be guided to avoid interference between the portion 121 of the cable 108 and the machine 104. The guiding device 122 may be configured to lift the cable 108 form the work surface 102 and dispose to another location in the work surface 102 to avoid any interference between the cable 108 and the machine 104. During the earth moving operation, the implement 116 of the machine 104 may be controlled to engage with the guiding device 122 to move the cable 108 to another location in the work surface 102.

In an exemplary aspect, the guiding device 122 may include a basket 122A and a handle 122B coupled to the basket 122A. The basket 122A may be configured to couple with the cable 108. If the machine 104 moves to a location in the worksite 100 by a distance greater than a length of the portion 121 of the cable 108, then the machine 104 may drag the guiding device 122 along the work surface 102. Similarly, if the machine 104 moves towards the guiding device 122, then the portion 121 of the cable 108 may lie behind the machine 104 in the work surface 102. It may also be contemplated that a bundle of the cable 108 may be accommodated within the basket 122A. The handle 122B may facilitate the machine 104 or the operator to lift the basket 122A along with the cable 108 and dispose the guiding device 122 at another location in the worksite 100. In another aspect of the present disclosure, a portion of the cable 108 extending between the guiding device 122 and the power source 106 may be guided by one or more support poles located in the worksite 100.

During the earth moving operation, the machine 104 may be controlled to move along the work surface 102 in the worksite 100. The frame 114 may rotate to various angular positions in order to facilitate the implement 116 to excavate and load material from various locations in the worksite 100 along a path of rotation. Further, the implement 116 may be controlled to unload material into one or more trucks 124. The truck 124 may transport material from the worksite 100 to another location. In the autonomous mode, the truck 124 may be controlled from a center remotely located from the worksite 100.

In the autonomous mode, the operator may control the machine 104 and the truck 124 from a command center located remotely from the worksite 100. The operator may communicate with the machine 104 and the truck 124 via a wireless network system. In another aspect, the operator may control the machine 104 and the truck 124 from a control console located remotely from the machine 104. However, the control console may be located within the worksite 100.

The machine 104 further includes a system 130 for tracking a position of the cable 108 extending between the machine 104 and the guiding device 122. The position of the cable 108 is determined to avoid any interference between the machine 104 and the cable 108 during operation of the machine 104 in the worksite 100. Further, the positon of the portion 121 of the cable 108 may be tracked to avoid any interference between the machine 104 and the guiding device 122 during operation of the machine 104 in the worksite 100.

Figure 2:
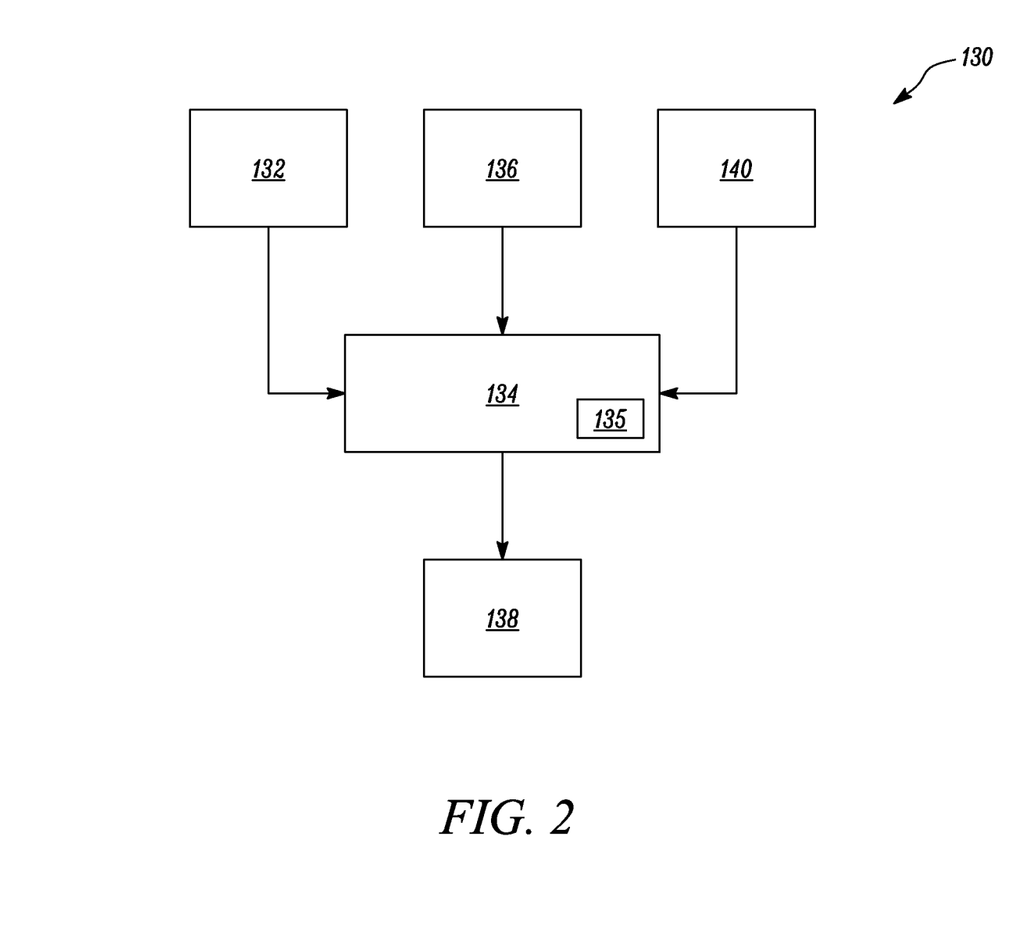
FIG. 2 is a schematic block diagram of the system, according to an embodiment of the present disclosure.

FIG. 2 illustrates a schematic block diagram of the system 130, according to an embodiment of the present disclosure. Referring to FIGS. 1 and 2, the system 130 includes a perception module 132 disposed on the machine 104. In an aspect of the current disclosure, the perception module 132 includes one or more cameras. The cameras may be disposed in the machine 104 for capturing images of surrounding of the machine 104 in the worksite 100. The cameras may be disposed in the frame 114 to capture images of surrounding area of the machine 104 within a field of view 133 of the cameras. However, it may be contemplated that the cameras may be disposed at any location in the machine 104 to capture images of the surrounding area of the machine 104. The field of view 133 of the cameras may be sufficient to detect a location of the guiding device 122 within the worksite 100. The cameras may be configured to continuously or periodically capture images of the surrounding area of the machine 104 during a travel thereof.

In another aspect of the current disclosure, the perception module 132 includes a scanning device for scanning the surrounding area of the machine 104 in the worksite 100. The scanning device may be configured to scan the surrounding area of the machine 104 within a field of view 133 of the scanning device. The field of view 133 of the scanning device may be sufficient to detect a location of the guiding device 122 within the worksite 100. In an example, the scanning device may be a laser scanner. The laser scanner may be configured to emit a laser beam and scan the surrounding area of the machine 104 within the field of view 133 of the laser scanner. The laser scanner may be disposed at any location in the machine 104. The laser scanner may continuously or periodically scan the surrounding area. The laser scanner may be positioned on the machine 104 so as to have a sufficient field of view to monitor the surrounding area of the machine 104 in the worksite 100 during travel of the machine 104.

In yet another aspect of the current disclosure, the perception module 132 may include a ranging radio for detecting a location of the guiding device 122 within the worksite 100. In an example, ranging radios may be disposed around the machine 104 and a unit thereof may be placed on the guiding device 122. Time of flight between the unit disposed on the guiding device 122 and the machine 104 may be used to detect a location of the guiding device 122. In various aspects of the current disclosure, the perception module 132 may include stereo cameras, a Lidar unit, a Radar unit, or any other known object detecting devices for detecting a location of the guiding device 122 within the worksite 100.

The system 130 further includes a controller 134 disposed in the machine 104 to communicate with the perception module 132. The controller 134 is configured to receive signals indicative of a location of the guiding device 122 generated by the perception module 132. If the perception module 132 includes the cameras, then the controller 134 may be configured to receive signals indicative of the image of the surrounding area of the machine 104 captured by the cameras. The controller 134 may be further configured to be in communication with the cameras to rotate the cameras and receive images corresponding to 360 degree view of the machine 104. If the perception module 132 includes the scanning device, then the controller 134 may be configured to receive signals indicative of image of the surrounding area of the machine 104 scanned by the scanning device. The controller 134 may be further configured to be in communication with the scanning device to rotate the scanning device and receive images corresponding to 360 degree view of the machine 104.

In an exemplary aspect of the current disclosure, a location of the perception module 132 within the machine 104 may be preset as a reference location. The reference location may be stored in a memory module 135 of the controller 134. Further, an image of the machine 104 may also be stored in the memory module 135. The controller 134 may be further configured to determine a location of the second end of the cable 108 in the machine 104 based on the reference location and the image of the machine 104.

In another aspect of the current disclosure, the system 130 includes a positioning sensor 136 disposed on the machine 104. The positioning sensor 136 is configured to generate signals indicative of a location of the machine 104 in the worksite 100. In an example, the positioning sensor 136 may be a satellite positioning device, such as a GPS receiver. The positioning sensor 136 is further communicably coupled to the controller 134. The controller 134 receives signals indicative of a location of the machine 104 in the worksite 100 from the positioning sensor 136 to determine the location of the machine 104 in the worksite 100.

Figure 3:
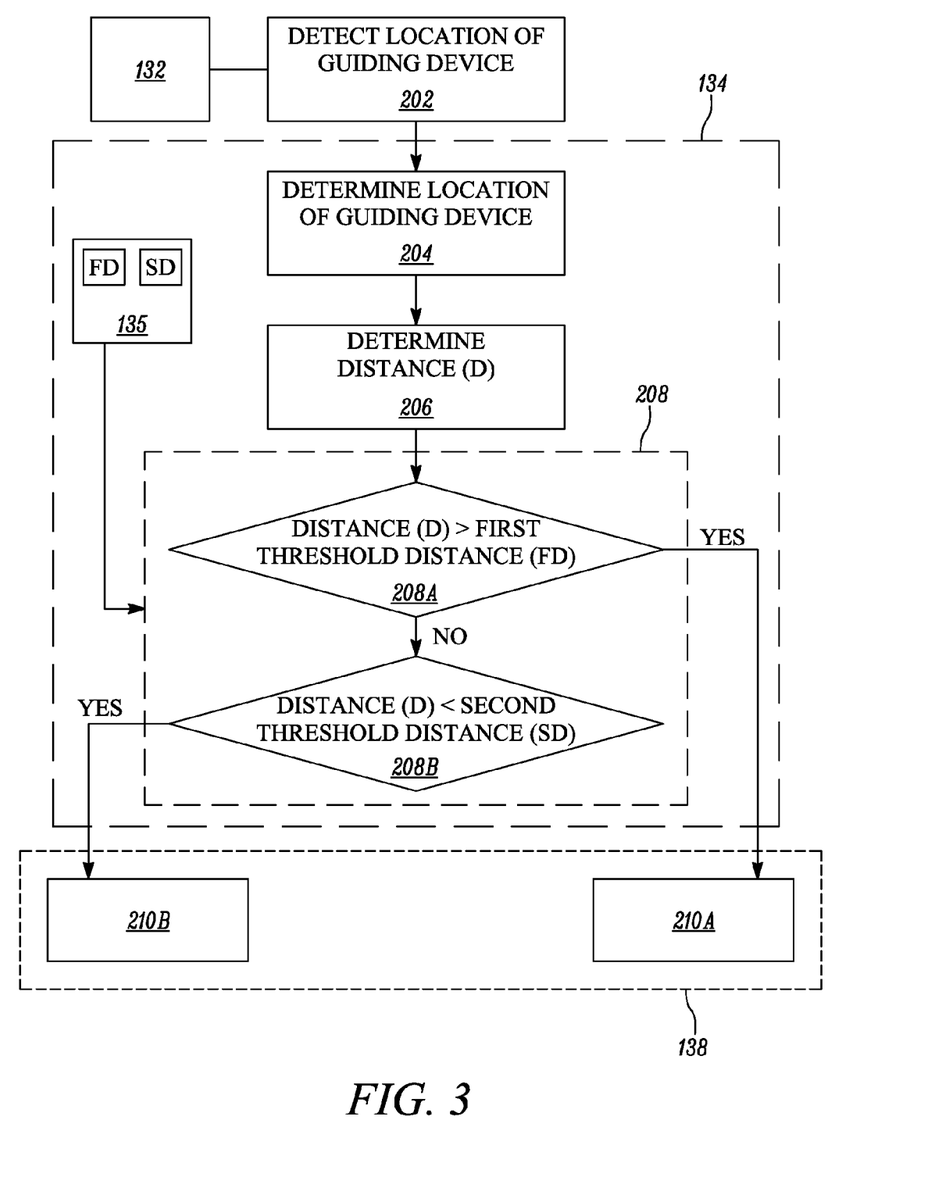
FIG. 3 is a schematic block diagram illustrating a controller of the system, according to an embodiment of the present disclosure.

FIG. 3 illustrates a schematic block diagram of the controller 134, according to an embodiment of the present disclosure. Referring to FIGS. 1 to 3, at step 202, the perception module 132 is configured to detect a location of the guiding device 122 within the worksite 100. The perception module 132 may either capture images of the surrounding area of the machine 104 and/or or scan the surrounding area of the machine 104 to detect the location of the guiding device 122 within the worksite 100. The perception module 132 may be further actuated by the controller 134 to detect the location of the guiding device 122 within the worksite 100. At step 204, the controller 134 is configured to determine the location of the guiding device 122 with respect to the location of the machine 104 in the worksite 100. In one example, the controller 134 may be configured to determine the location of the guiding device 122 with respect to the reference location of the perception module 132. In another example, the controller 134 may be configured to determine the location of the guiding device 122 with respect to the location of the machine 104. In yet another example, an additional positioning sensor 136 may be disposed on the guiding device 122 to determine a location of the guiding device 122 within the worksite 100.

Figure 4:
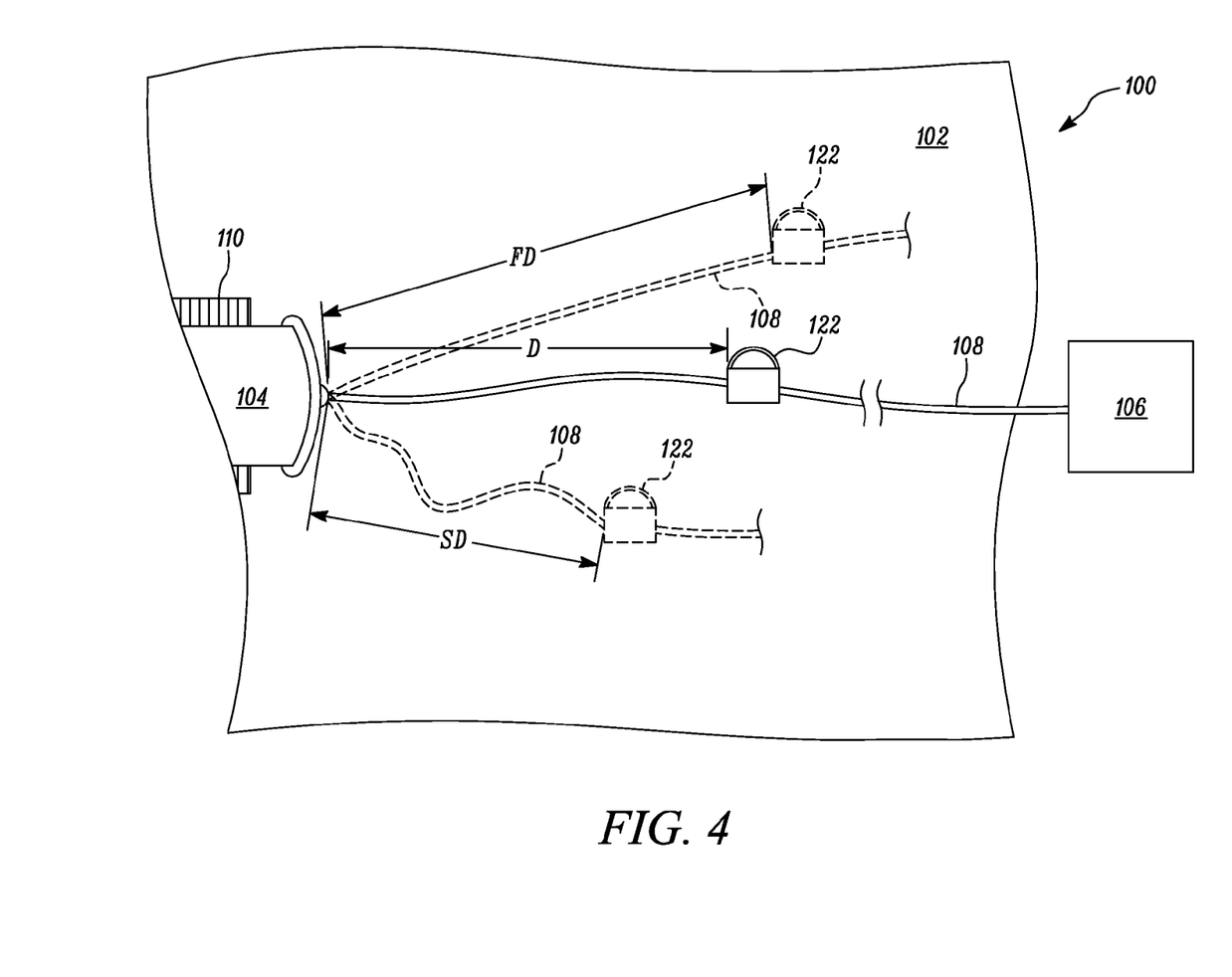
FIG. 4 is a schematic diagram showing various locations of a guiding device and corresponding positions of the cable in the worksite, according to an embodiment of the present disclosure.

Referring to FIGS. 3 and 4, at step 206, the controller 134 is further configured to determine a distance 'D' between the guiding device 122 and the machine 104. Exemplary location of the guiding device 122 is shown in FIG. 4 for illustration purpose of the present disclosure. Specifically, the controller 134 is configured to determine the distance 'D' between the guiding device 122 and a location in the undercarriage 110 at which the second end of the cable 108 is attached. The distance 'D' may correspond to a linear measurement between the machine 104 and the guiding device 122. In an example, the distance 'D' may be determined based on a relationship between the location of the guiding device 122 and the location of the machine 104 in the worksite 100.

At step 208, the controller 134 is configured to compare the distance 'D' with a first threshold distance 'FD' and a second threshold distance 'SD'. The first threshold distance 'FD' may correspond to a maximum distance at which the guiding device 122 may be disposed in the worksite 100 with respect to the machine 104 without creating any tension in the portion 121 of the cable 108. The first threshold distance 'FD' may be predefined based on various parameters including, but not limited to, elasticity of the cable 108 and weight of the guiding device 122. The first threshold distance 'FD' may be stored in the memory module 135 of the controller 134 before start of the earth moving operations by the machine 104.

The second threshold distance 'SD' may correspond to a minimum distance at which the guiding device 122 may be disposed in the worksite 100 with respect to the machine 104 without causing any interference between the machine 104 and the portion 121 of the cable 108. The second threshold distance 'SD' may be predefined based on various parameters including, but not limited, elasticity of the cable 108 and movement of the undercarriage 110 of the machine 104 during earth moving operations of the machine 104. The second threshold distance 'SD' may be stored in the memory module 135 of the controller 134 before start of the earth moving operations of the machine 104.

The controller 134 is configured to generate a warning via a warning device 138 if the distance 'D' is greater than the first threshold distance 'FD' or smaller than the second threshold distance 'SD'. At step 208A, the controller 134 is configured to compare the distance 'D' with the first threshold distance 'FD'. If the distance 'D' is greater than the first threshold distance 'FD', then the controller 134 is configured to generate a stretch warning, as shown at step 210A. If the distance 'D' is smaller than the first threshold distance 'FD', then the controller 134 is configured to compare the distance 'D' with the second threshold distance 'SD'. At step 208B, the controller 134 compares the distance 'D' with the second threshold distance 'SD'. If the distance 'D' is smaller than the second threshold distance 'SD', then the controller 134 is configured to generate a run-over warning, as shown at step 210B. Thus the position of the cable 108 behind the machine 104 is tracked based on the location of the guiding device 122 within the worksite 100.

The warning device 138 may be located within the operator cab 117 of the machine 104. However, it may be contemplated that the warning device 138 may be located anywhere in the machine 104 to alarm the operator about the location of the guiding device 122 in the worksite 100. The warning device 138 may be further communicated with the controller 134 to receive signals indicative of the stretch warning or the run-over warning. In one example, the warning device 138 may be a lamp that may flash or glow differently based on the stretch warning and the run-over warning. In another example, the warning device 138 may be an audio device for producing sounds differently based on the stretch warning and the run-over warning.

In another aspect of the present disclosure, the system 130 includes a rotation sensor 140 disposed in the machine 104. The rotation sensor 140 is configured to generate signals indicative of an angular positon of the frame 114 with respect to the undercarriage 110 of the machine 104. The rotation sensor 140 may be disposed in the frame 114. However, it may be contemplated that the rotation sensor 140 may be disposed at any location in the machine 104. The rotation sensor 140 is further communicably coupled to the controller 134. The controller 134 is configured to receive signals indicative of the angular position of the frame 114 with respect to the undercarriage 110 from the rotation sensor 140. The controller 134 further determines the angular positon of the frame 114 and the implement 116 with respect to the undercarriage 110.

In the autonomous mode, the operator located at the command center may get the stretch warning or the over-run warning from the machine 104 if the distance 'd' of the guiding device 122 with respect to the machine 104 is greater than the first threshold distance 'FD' or smaller than the second threshold distance 'SD', respectively. Based on the type of warning, the operator may communicate signals with the controller 134 to control the implement 116 to move the guiding device 122 to a desired location in the worksite 100 with respect to the machine 104 at a desired distance. Specifically, the controller 134 may actuate the dipper 120 to lift the guiding device 122 to move the cable 108 to the desired location. The desired distance is smaller than the first threshold distance 'FD' and greater than the second threshold distance 'SD'. Further, the desired location may fall anywhere in the worksite 100 between a first threshold location and a second threshold location with respect to the machine 104. The first threshold location may correspond to a location of the guiding device 122 in the worksite 100 at the first threshold distance 'FD' with respect to the machine 104. The second threshold location may correspond to a location of the guiding device 122 in the worksite 100 at the second threshold distance 'SD' with respect to the machine 104.

In an exemplary aspect of the current disclosure, the implement 116 may be actuated by one or more hydraulic actuators associated with a hydraulic system of the machine 104. The hydraulic system may be in communication with the controller 134 to control the movement of the implement 116 based on signals received from the controller 134. If the controller 134 receives input from the operator based on the stretch warning or the over-run warning, then the controller 134 may communicate with the hydraulic system to control the implement 116 to move the guiding device 122 at the desired location.

INDUSTRIAL APPLICABILITY

The present disclosure relates to the system 130 and a method 300 for tracking the position of the cable 108 attached between the power source 106 and the machine 104 in the worksite 100. The system 130 includes the perception module 132 and the controller 134 to determine the location of the guiding device 122 within the worksite 100 with respect to the machine 104. The controller 134 further determines the distance 'D' between the machine 104 and the guiding device 122 and compares with the first threshold distance 'FD' and the second threshold distance 'SD' to generate the warning. Stretch warning is generated if the distance 'D' is greater than the first threshold distance 'FD' and over-run warning is generated if the distance 'D' is smaller than the second threshold distance 'SD'. Thus the position of the cable 108 behind the machine 104 is tracked based on the location of the guiding device 122 in the worksite 100. Further, the operator may take corrective action during the operation of the machine 104 to avoid damages to the cables 108.

Figure 5:
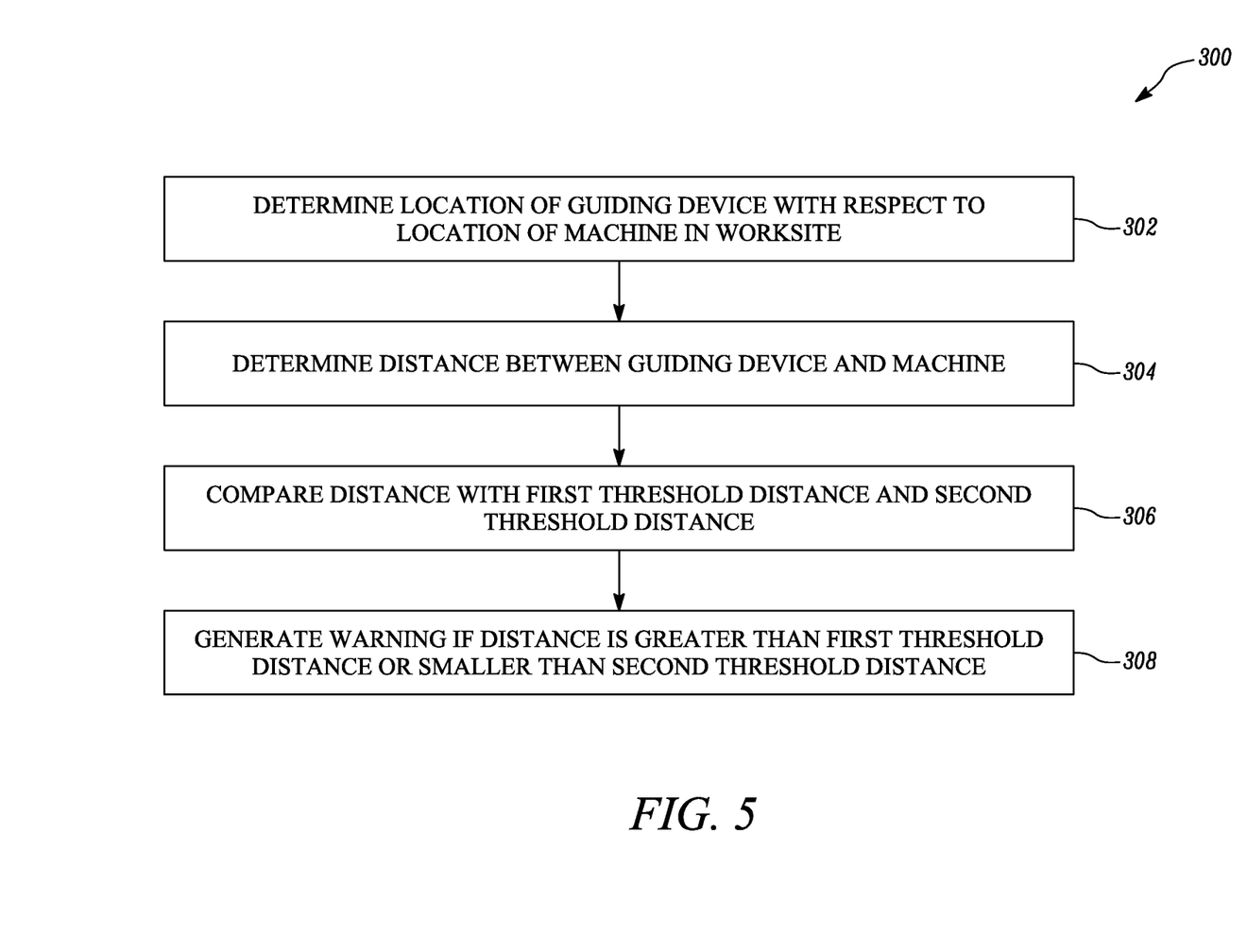
FIG. 5 is a flow chart of a method of tracking the position of the cable attached to the machine, according to an embodiment of the present disclosure.

FIG. 5 illustrates the method 300 of tracking the position of the cable 108 attached to the machine 104, according to an embodiment of the present disclosure. At step 302, the method 300 includes determining the location of the guiding device 122 with respect to the location of the machine 104 in the worksite 100. The perception module 132 disposed on the machine 104 detects the location of the guiding device 122 within the worksite 100 and generates signals indicative of the location of the guiding device 122. The controller 134 in communication with the perception module 132 receives the signals from the perception module 132 and determines the location of the guiding device 122 with respect to the machine 104. In an aspect of the present disclosure, the controller 134 may determine the location of the guiding device 122 with respect to the reference location of the perception module 132 in the machine 104. In another aspect of the current disclosure, the controller 134 in communication with the positioning sensor 136 disposed on the machine 104 and the guiding device 122 may determine the location of the guiding device 122 with respect to the machine 104 in the worksite 100.

At step 304, the method 300 includes determining the distance 'D' between the guiding device 122 and the machine 104. In an aspect of the present disclosure, the controller 134 may determine the distance 'D' with reference to the reference location of the perception module 132 in the machine 104. In another aspect of the current disclosure, the controller 134 may determine the distance 'D' with reference to the undercarriage 110 of the machine 104. At step 306, the method 300 includes comparing the distance 'D' with the first threshold distance 'FD' and the second threshold distance 'SD'. The controller 134 compares the distance 'D' with the first threshold distance 'FD' initially. If the distance 'D' is smaller than the first threshold distance 'FD', then the controller 134 compares the distance 'D' with the second threshold distance 'SD'. At step 308, the method 300 includes generating the warning if the distance 'D' is greater than the first threshold distance 'FD', or smaller than the second threshold distance 'SD'. The controller 134 generates the stretch warning if the distance 'D' is greater than the first threshold distance 'FD'. The controller 134 further generates the over-run warning if the distance 'D' is smaller than the second threshold distance 'SD'.

According to the present disclosure, the location of the guiding device 122 with respect to the machine 104 is tracked such that the guiding device 122 may be moved to various locations in the worksite 100 by controlling the implement 116 of the machine 104 or by the operator to avoid any tension in the cable 108 or run-over situation of the cable 108. Further, during the earth moving operations of the machine 104, any interference between the dipper 120 and the cable 108 may be avoided while lifting the guiding device 122. In the autonomous mode, any interference between the undercarriage 110 of the machine 104 and the guiding device 122 may be avoided. Further, the controller 134 is configured to detect only the location of the guiding device 122 rather than identifying the guiding device 122 as an object that may prevent the machine 104 from rotating the frame 114 thereof during the operations. The controller 134 may be further communicated with a controller disposed in the truck 124 to control movement of the truck 124 based on the location of the guiding device 122 and the positions of the cable 108 in the worksite 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for tracking a position of a cable attached between a power source and a machine in a worksite, the cable being releasably coupled to a guiding device located in the worksite between the power source and the machine, the system comprising:

a perception module disposed on the machine, the perception module configured to detect a location of the guiding device within the worksite; and a controller disposed to be in communication with the perception module, the controller configured to:
  determine the location of the guiding device with respect to a location of the machine in the worksite;
  determine a distance between the guiding device and the machine;
  compare the distance with a first threshold distance and a second threshold distance, the first threshold distance being a maximum distance between the guiding device and the machine without creating tension in the cable and the second threshold distance being a minimum distance between the guiding device and the machine without causing interference between the machine and the cable; and
  generate a warning if the distance is greater than the first threshold distance or smaller than the second threshold distance.

2. The system of claim 1 further comprising a positioning sensor disposed on the machine and communicably coupled to the controller, the positioning sensor configured to generate signals indicative of the location of the machine.

3. The system of claim 1, wherein the perception module comprises a camera for capturing images of surrounding of the machine in the worksite.

4. The system of claim 1, wherein the perception module comprises a scanning device for scanning surrounding of the machine in the worksite.

5. The system of claim 1, wherein the controller is further configured to:
  compare the distance with the first threshold distance; and
  compare the distance with the second threshold distance if the distance is smaller than the first threshold distance.

6. The system of claim 1 further comprising a rotation sensor disposed on the machine, the rotation sensor configured to generate signals indicative of an angular position of a frame of the machine with respect to an undercarriage thereof.

7. The system of claim 6, wherein the controller is further configured to control an implement of the machine coupled to the frame thereof to move the guiding device to a desired location with respect to the machine, and wherein a desired distance between the desired location and the machine is smaller than the first threshold distance and greater than the second threshold distance.

8. The system of claim 1, wherein the controller is configured to generate a stretch warning if the distance is greater than the first threshold distance.

9. The system of claim 1, wherein the controller is configured to generate a run-over warning if the distance is smaller than the second threshold distance.

10. A machine comprising:
an undercarriage comprising a ground engaging member configured to support the machine;
a frame rotatably disposed on the undercarriage;
a cable attached to the undercarriage for receiving power from a power source located remotely from the machine, the cable further releasably coupled to a guiding device disposed at a worksite between the power source and the machine; and
a system for tracking a position of the cable extending between the machine and the guiding device, the system comprising:

a perception module disposed on the machine, the perception module configured to detect a location of the guiding device within the worksite; and controller disposed to be in communication with the perception module, the controller configured to:
- determine the location of the guiding device with respect to a location of the machine in the worksite;
- determine a distance between the guiding device and the machine;
- compare the distance with a first threshold distance and a second threshold distance, the first threshold distance being a maximum distance between the guiding device and the machine without creating tension in the cable and the second threshold distance being a minimum distance between the guiding device and the machine without causing interference between the machine and the cable; and
- generate a warning if the distance is greater than the first threshold distance or smaller than the second threshold distance.

11. The machine of claim 10 further comprising a positioning sensor disposed on the machine and communicably coupled to the controller, the positioning sensor configured to generate signals indicative of the location of the machine.

12. The machine of claim 10, wherein the perception module comprises a camera for capturing images of surrounding of the machine in the worksite.

13. The machine of claim 10, wherein the perception module comprises a scanning device for scanning surrounding of the machine in the worksite.

14. The machine of claim 10, wherein the controller is further configured to:
- compare the distance with the first threshold distance; and
- compare the distance with the second threshold distance if the distance is smaller than the first threshold distance.

15. The machine of claim 10 further comprising a rotation sensor disposed on the machine, the rotation sensor configured to generate signals indicative of an angular position of the frame with respect to the undercarriage of the machine.

16. The machine of claim 15, wherein the controller is further configured to control an implement of the machine coupled to the frame thereof to move the guiding device to a desired location with respect to the machine, and wherein a desired distance between the desired location and the machine is smaller than the first threshold distance and greater than the second threshold distance.

17. The machine of claim 10, wherein the controller is configured to generate a stretch warning if the distance is greater than the first threshold distance.

18. The machine of claim 10, wherein the controller is configured to generate a run-over warning if the distance is smaller than the second threshold distance.

19. A method of tracking a position of a cable attached between a power source and a machine in a worksite, the cable being releasably coupled to a guiding device located in the worksite between the power source and the machine, the method comprising:
- determining, by a controller, a location of the guiding device with respect to a location of the machine in the worksite;
- determining, by the controller, a distance between the guiding device and the machine;
- comparing, by the controller, the distance with a first threshold distance and a second threshold distance, the first threshold distance being a maximum distance between the guiding device and the machine without creating tension in the cable and the second threshold distance being a minimum distance between the guiding device and the machine without causing interference between the machine and the cable; and
- generating, by the controller, a warning if the distance is greater than the first threshold distance or smaller than the second threshold distance.

20. The method of claim 19 further comprising:
- comparing, by the controller, the distance with the first threshold distance; and
- comparing, by the controller, the distance with the second threshold distance if the distance is smaller than the first threshold distance.

* * * * *